United States Patent [19]
Lueder

[11] Patent Number: 5,833,492
[45] Date of Patent: Nov. 10, 1998

[54] FLAT BATTERY POSTS

[75] Inventor: Lawrence Arimidio Lueder, 698 Bridgeton Pike, Mantua, N.J. 08051-1351

[73] Assignee: Lawrence Arimidio Lueder, Mantua, N.J.

[21] Appl. No.: 801,969

[22] Filed: Feb. 18, 1997

[51] Int. Cl.6 .................................................. H01R 3/00
[52] U.S. Cl. ........................... 439/500; 429/178; 439/627
[58] Field of Search ................................ 439/500, 627, 439/502, 523; 429/178, 179, 121, 99, 158

[56] References Cited

U.S. PATENT DOCUMENTS 1,574,297  2/1926  Lilleberg ................................ 439/623
5,415,947  5/1995  Mitsui et al. ............................ 429/99
5,437,938  8/1995  Mitsui et al. ........................... 429/178
5,578,395  11/1996 Kawamura .............................. 429/178

*Primary Examiner*—Neil Abrams
*Assistant Examiner*—T. C. Patel

[57] ABSTRACT

A battery for energizing engine electrical starters, motors and electrical equipment comprises a flat negative terminal post and a flat positive terminal post located underneath the battery casing. The battery is easy to install and easy to maintain.

5 Claims, 7 Drawing Sheets

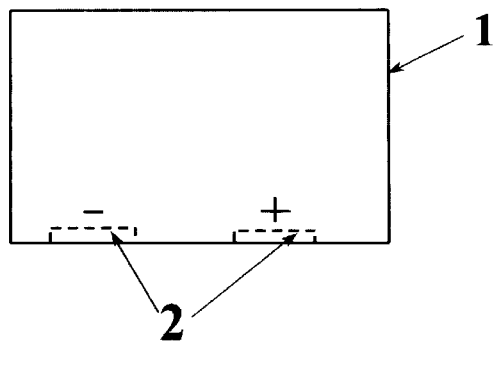
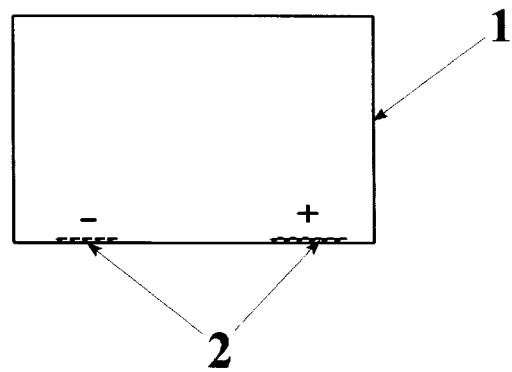
Fig. 11	Fig. 12
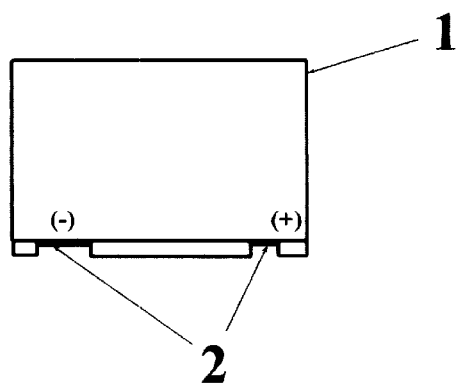
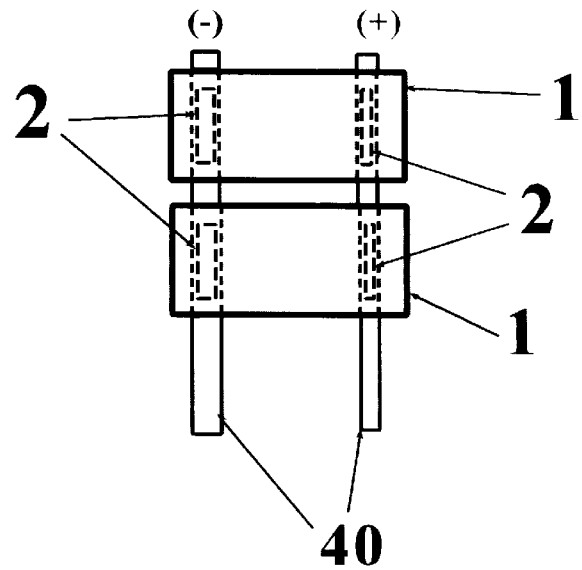
Fig. 13	Fig. 14

FLAT BATTERY POSTS

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A MICROFICHE APPENDIX

Not applicable

FIELD OF THE INVENTION

The present invention relates to heavy duty starter batteries of the lead acid type including connection cables installed in automotive, marine or other equipment that uses high amperage, low voltage batteries.

BACKGROUND OF THE INVENTION

Heavy duty starter batteries installed in cars or marine boats have electrical cabling connections on top or on the side of the battery. Under both methods the cable connection is prone to breakdown. For example with top post terminals the split lead cable connector can tear/split from over tightening nut and bolt. Side battery terminals normally rely on a ¼ inch bolt for connection and applied contact force. Anybody with any experience with this setup is familiar with it's thread stripping failure. Both connection methods require special cleaning brushes to insure good contact. The post terminal requires a male and female type brush and the side post requires thread retapping. Another problem with existing systems is in cable removal. The post terminal may require a special puller and the side post ¼ inch bolt many times corrodes/breaks. Batteries with top or side connection take up more space, are difficult to connect in series or parallel. And with terminal post located close to the top of a battery it's more apt to ignite some of the hydrogen gases during cable installations.

SUMMARY OF THE INVENTION

Accordingly, it is an object of the present invention to provide an automobile/marine battery with terminal connections that are easy to connect and service.

Another object of the present invention is to provide a battery and cabling that reduces potential explosions caused from igniting hydrogen gases.

Other objects and advantages of the present invention will become more obvious hereinafter in the specification and drawings.

In accordance with the present invention, a battery that's simple to connect and is less likely to cause hydrogen gas ignition consists of battery with terminal connections installed underneath. The battery terminal connections are flat pads which make contact to a cable system designed with flat paddle connectors. A series of paddles molded on a cable permits a series or parallel battery connection. Existing battery hold down methods would suffice to provide terminal post contact. And cleaning the terminal is as easy as wiping the contact plates with sand paper or any wire brush.

DESCRIPTION OF THE DRAWINGS

FIG. 11 is a side view of a battery with recessed terminals.
FIG. 12 is a side view of a battery with flush terminals.
FIG. 13 is a side view of a battery with underneath slotted terminals.
FIG. 14 is a top view of two batteries with underneath terminals connected in parallel on railing terminal connections.

DETAILED DESCRIPTION OF THE INVENTION

Figure 1:
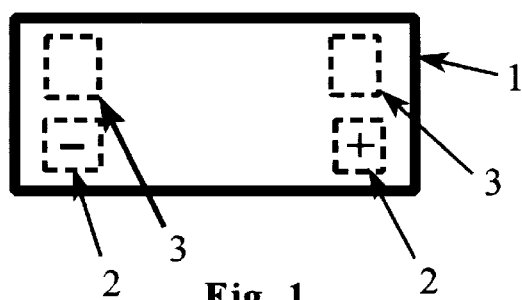
FIG. 1 is a top view of the subject battery invention.

Referring now to the drawings, and more particularly to FIG. 1. One embodiment of the battery 1 is shown in top view. Battery 1 consists of casing design per various automobile industries specifically to deliver a low voltage, high amperage discharge to various electrical components, especially starter motors. Specific details of the battery not shown due to the many diverse models and configurations control privilege of the manufacturer. Battery 1 details also omitted because this invention is about terminal post connections on the battery and fill caps, mounting flanges, etc. are irrelevant. This specification is not intended to go into a batteries makeup or operation but to suggest alternative post connection methods.

FIG. 1 shows two battery support shoes 3 and two terminal post connectors 2 located underneath the battery 1. The terminal post connectors 2 are located along the length side of the battery 1 as is the two support shoes 3 which are on the opposite length side. The dimensions, size or configuration of the terminal post connectors 2 and support shoes 3 is per manufacturer preference. The polarity location is insignificant and shown only to distinguish the terminal post connectors 2 from the support shoes 3.

Figure 2:
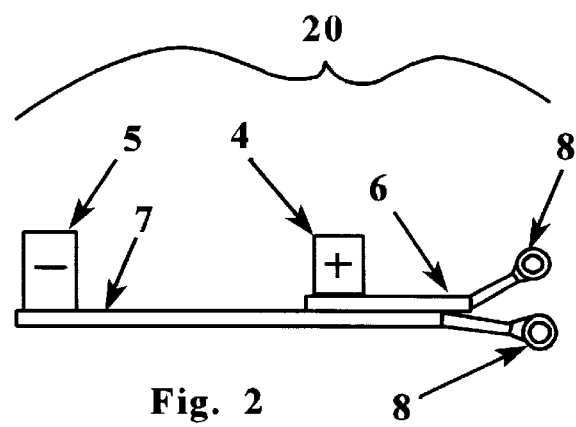
FIG. 2 is a top view of the subject cable invention.

FIG. 2 shows what the battery 1 cable 20 might look like consisting of a positive contact plate 4 and a negative contact plate 5. Although not necessary, the negative plate 5 is shown extending longer than the positive plate 4. The purpose is to insure that the negative plate 5 can significantly reach and make contact with the battery's negative terminal post connection plate 2. The post plates are identified as negative and positive, but can be either negative or positive as are many commercial battery cable clamps on the market today and used interchangeably. Terminal post plates 4 and 5 can be crimped or molded on the cable wiring 6 and 7. Cable terminal lugs 8 is per manufacturer preference.

Figure 3:
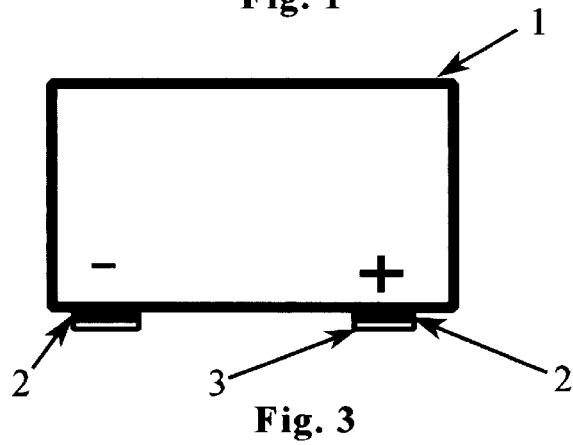
FIG. 3 is a side view of the subject battery invention.
Figure 4:
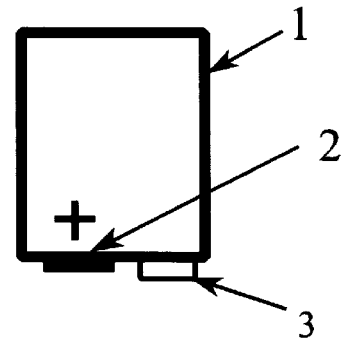
FIG. 4 is an end view of the subject battery invention.

FIG. 3 shows a side view of FIG. 1, battery 1. It shows the support shoes 3 extending farther down than the terminal post plates 2. This can be better viewed by looking at end view FIG. 4.

Figure 5:
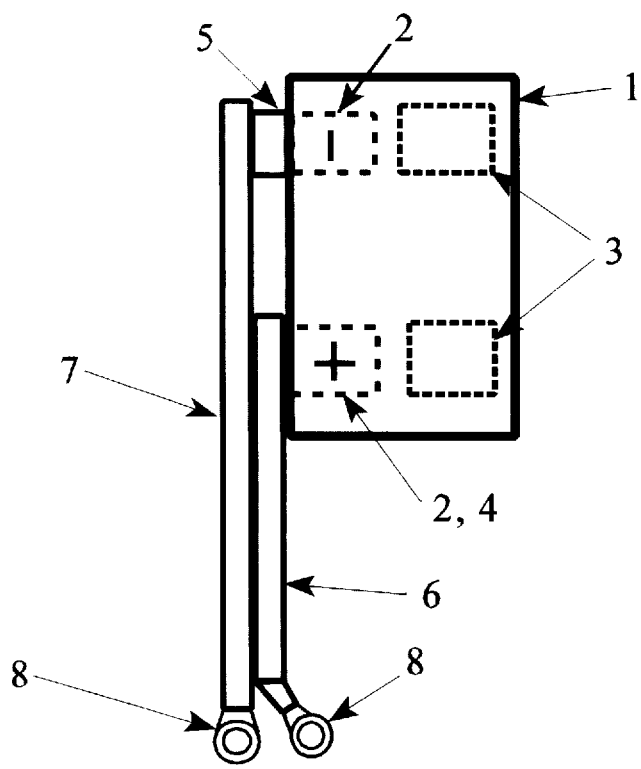
FIG. 5 is a top view of the subject battery invention with cable connected.

FIG. 5 is a top view of battery 1 as it might look connected to the special cable with flat contact plates 4 and 5. An end view (not shown) would illustrates that the battery 1 is now level with the terminal cable plates 2 in place.

Figure 6:
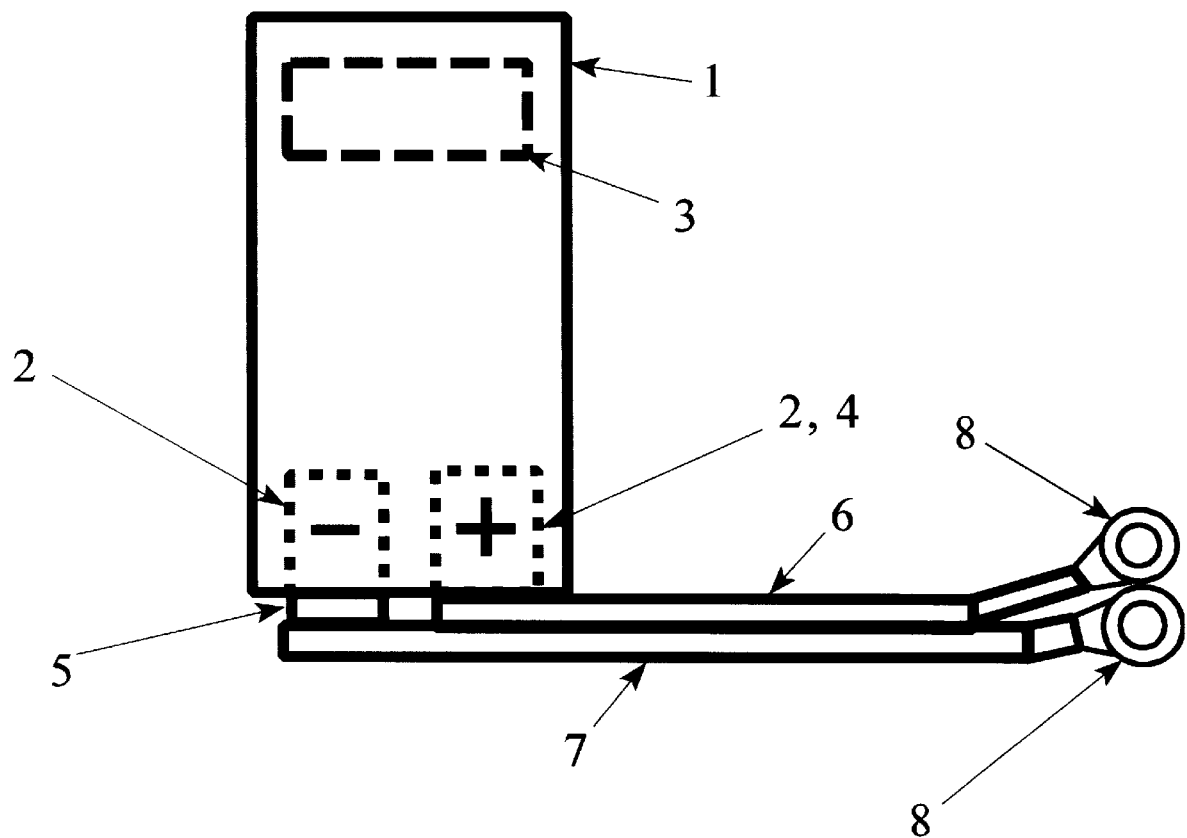
FIG. 6 is a top view of another design of the subject battery invention with cable.

FIG. 6 is another embodiment of the original battery design but the terminal posts 2 are now along one side of the width. The dimensions, configuration, etc. of the support shoes 3 and battery posts 2 is per manufacturer preference.

Figure 7:
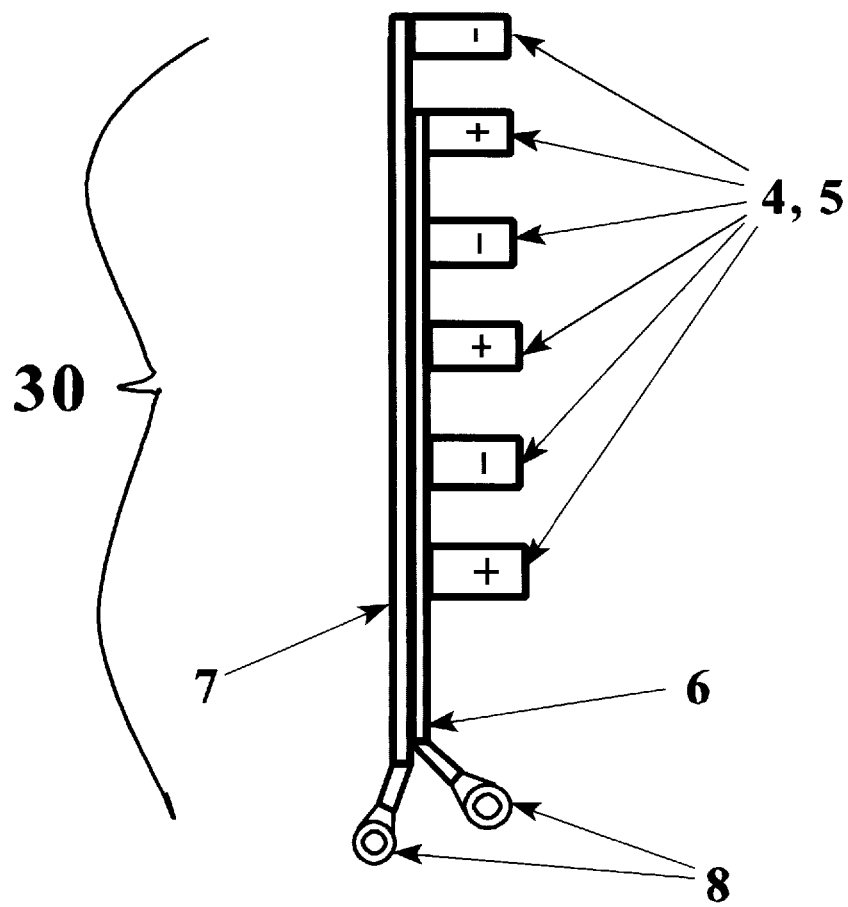
FIG. 7 is a top view of a series/parallel battery cable.
Figure 8:
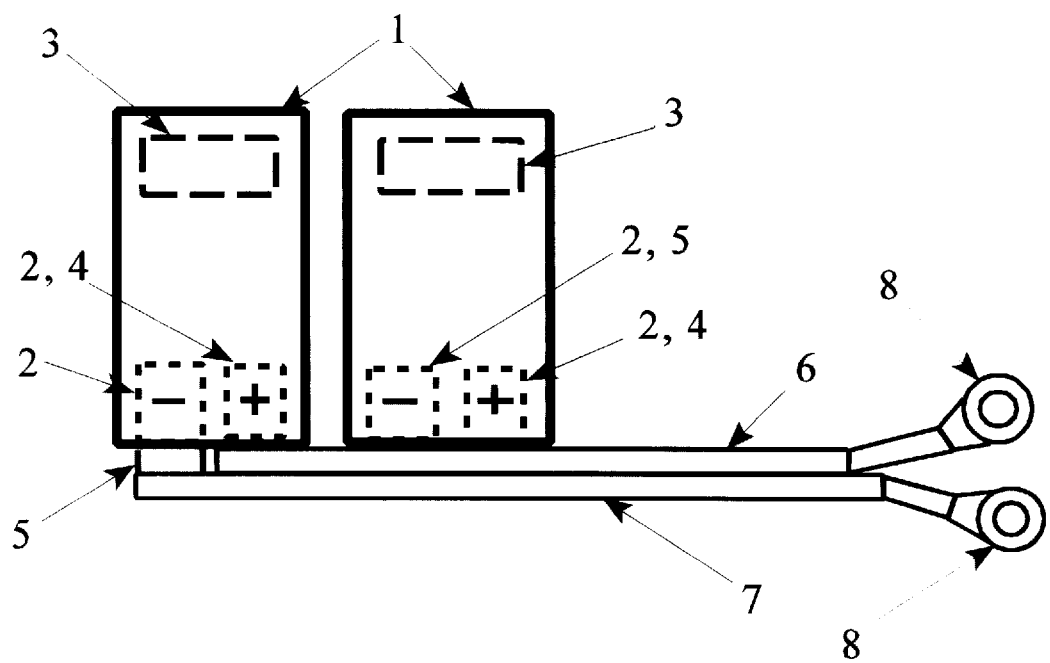
FIG. 8 is a top view of two batteries with a series/parallel cable connected.

FIG. 7 illustrates what a battery cable might look like for series or parallel connections. Terminal plate contacts 4 and 5, quantities, location, configuration, etc. of plates is per manufacturer preference. FIG. 8 shows the series/parallel cable 30 as it might look from a top view connected to two batteries 1. The batteries 1 in this view illustrate end or width end bottom connections.

Figure 9:
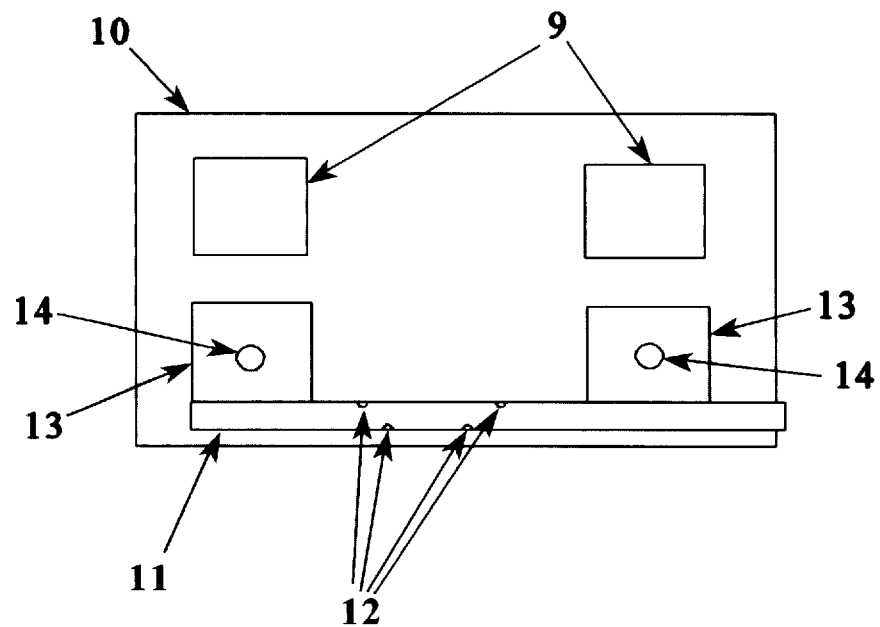
FIG. 9 is a top view of a battery tray.
Figure 10:
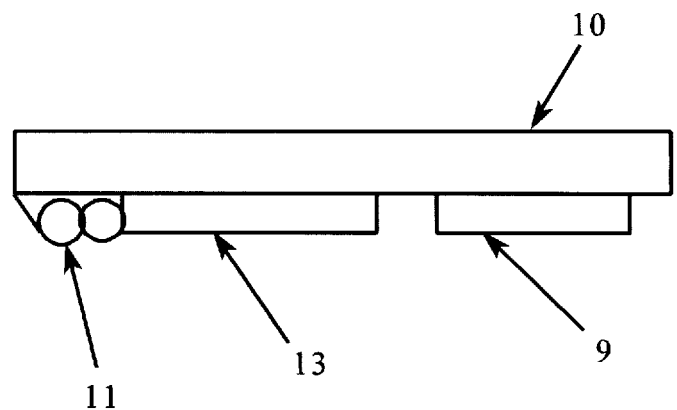
FIG. 10 is an end view of FIG. 9.

FIG. 9 is one embodiment of a battery 1 support bracket 10. FIG. 10 is an end view of the support bracket 10. Recessed pockets 9 are designed to receive the battery support shoes 3. And the recessed terminal plate pockets 13 cradle the cable terminal plates 2. Cable run 11 is molded in the support bracket and the cable 6 and 7 held down per tabs 12 located along cable run 11 per manufacturer preference. Cable terminal plates 4 and 5 can be designed to snap into support bracket 10, pockets 13 or held in place using through holes 14 with any of the many fastener methods. A battery with equal thickness size terminal post 2 and support shoes 3 would equally have a deeper pocket 13 to receive the cable terminal plates 4 and 5. And yet another design for the pockets is to configure them to ensure proper polarity and battery size. The support bracket 10 holes 14 can be used to not only secure the cable terminal plates 4 and 5 but also to hold down the battery at the same time. To hold down the battery 1, studs (not shown) would have to be molded-in the battery post or the post would require female threads.

FIG. 11 is another embodiment of the invention with terminal posts 2 recessed pockets underneath the battery casing to prevent shorting on metal surfaces. Battery post configuration, dimensions, location is per manufacturer preference.

FIG. 12 is yet another embodiment of the invention with terminal flat post 2 level with the underneath bottom of the battery 1. Such a battery although easy to manufacture would have some drawbacks from post discharging stored energy from various surface contacts.

Flat spring metal spacers/washers (not shown) can be inserted between flat cable terminals (4,5) and supporting bracket 10 to insure constant contact pressure between battery post 2 and flat cable terminals (4,5). These springs (not shown) can also be part of the flat cable terminals crimped or molded-in.

And last FIG. 13 is a battery 1 with underneath terminal posts that are slotted 2. FIG. 14 is a top view of two FIG. 13 showing two batteries connected in parallel on two electrode railings 40. Railings 40 are shown of different widths to insure proper polarity during install. Railing terminals can be semicircular, rectangular or of "V" form.

Advantages of new design

1—Easier to clean battery terminal posts and cable terminal contact plates.

2—Existing battery hold down methods would suffice to apply contacts between the battery post and cables.

3—Less likely to ignite hydrogen gases given off from the battery. Lighter hydrogen gases float up and unlike conventional batteries with terminal post on top. My flat post are located at it's farthest point from battery top surface.

4—Batteries can be designed with much lower heights. A plus to auto manufacturers.

5—Reduced assemble time. One operation clamps and connects the battery.

6—Less material and weight in a car. Clamping terminal bolts and nuts done away with.

7—Parallel or series applications such as with large diesel engines would show most benefit from this design in that there wouldn't be a need to install several pig tail cable connections from one battery to another.

8—This battery design could easily be adapted to futuristic electric automobiles.

9—The ease of dropping in the battery and contact made lends itself for those situations where an individual might only want to just start an engine. An example would be in marine boats or tractors where once the engine is started, the dieseling keeps the engine running or there is a magneto ignition arrangement. The person immediately removes the battery after starting to avoid theft of the battery or to keep it garaged fully charged. And there's the possibility for safety, the battery is removed to keep children or vandals from starting equipment when not in use.

10—The battery posts outlast existing protruding or side connection post from repeated on and off disconnections. Eventhough existing top and side post can be included to make universal.

11—The nice feature about FIG. 13, and 14 (underneath slotted terminals) is that the railing allows for ease of installation and unlimited number of batteries can be quickly connected/installed. For motorized wheel chairs the rail eases installation by allowing the batteries to be slid under the seating. A simple hold down rod on top of the single or dual batteries would secure them. And the sliding feature lends itself to self cleansing the terminal post of oxidation.

Special note: Battery casing and internal components is per manufacture preference and is not mentioned as parts in the claim. Although the invention has been described relative to specific embodiment thereof, there are numerous other variations and modifications that will be readily apparent to those skilled in the art in the light of the above teachings. For example, while the appearance of the battery 1, FIG. 1, appears to look like an early form of existing starter batteries it is by no means restricted to that simple style battery configuration. It is thereof to be understood that, within the scope of the appended claims, the invention may be practiced other than as specifically described.

What is claimed is:

1. A battery for energizing engine electrical starters, motors and electrical equipment, the battery being of the lead acid type, said battery comprising:

a first part negative flat plane terminal post located on the underside of the battery casing, and a second part positive flat plane terminal post located on the underside of the battery casing.

2. A battery as in claim 1 wherein said flat plane terminal post connectors are flush level with the underneath side of said battery casing.

3. The battery as in claim 1 with underneath side support shoe/s to level imbalance.

4. A battery as in claim 1 wherein said flat plane terminal post connectors are in recessed pockets underneath said battery casing.

5. A battery as in claim 1 wherein said flat plane terminal post connectors are in recessed slots underneath said battery casing for series and parallel connections on sliding rails.

* * * * *